US011934761B2

(12) United States Patent
Jhoja et al.

(10) Patent No.: US 11,934,761 B2
(45) Date of Patent: Mar. 19, 2024

(54) LATTICE-IMPOSED INVERSE DESIGN OF PHYSICAL DEVICES

(71) Applicant: X Development LLC, Mountain View, CA (US)

(72) Inventors: Jaspreet Singh Jhoja, Vancouver (CA); Brian Adolf, San Mateo, CA (US)

(73) Assignee: X Development LLC, Mountain View, CA (US)

( * ) Notice: Subject to any disclaimer, the term of this patent is extended or adjusted under 35 U.S.C. 154(b) by 535 days.

(21) Appl. No.: 17/122,984

(22) Filed: Dec. 15, 2020

(65) Prior Publication Data
US 2022/0188497 A1    Jun. 16, 2022

(51) Int. Cl.
*G06F 30/39* (2020.01)
*G06F 119/18* (2020.01)

(52) U.S. Cl.
CPC .......... *G06F 30/39* (2020.01); *G06F 2119/18* (2020.01)

(58) Field of Classification Search
CPC ....... G06F 30/39; G06F 2119/18; G06F 30/20
USPC ...................................... 703/13, 1
See application file for complete search history.

(56) References Cited

PUBLICATIONS

Borel, P.I., et al., "Topology optimization and fabrication of photonic crystal structures", Optics Express, vol. 12, No. 99, May 3, 2004, 7 pages.
Huntington, M.D., et al. "Subwavelength Lattice Optics by Evolutionary Design", ACS Publications, Nano Lett. 14, 2014, pp. 7195-7200.
Hakansson, A., et al., "Inverse Design of Photonic Crystal Devices," IEEE Journal on Selected Areas in Communications, pp. 1-8. (vol. 23, Issue 7, Jul. 2005).
Ren, X., et al., "Digitized Adjoint Method for Inverse Design of Digital Nanophotonic Devices," arXiv: Optics (2019).

*Primary Examiner* — Juan C Ochoa
(74) *Attorney, Agent, or Firm* — Christensen O'Connor Johnson Kindness PLLC

(57) ABSTRACT

In some embodiments, techniques for creating fabricable segmented designs for physical devices are provided. A proposed segmented design is determined based on a design specification. The proposed segmented design includes a plurality of segments that each includes an indication of a material for the segment. The proposed segmented design also includes lattice members and lattice voids. A size of the lattice members and a size of the lattice voids are greater than a size of the segments and are greater than or equal to at least one of a minimum feature width and a minimum feature spacing of a fabrication system Performance of the proposed segmented design is simulated. One or more lattice members and lattice voids are chosen to change to improve the performance of the proposed segmented design.

20 Claims, 11 Drawing Sheets

LATTICE-IMPOSED INVERSE DESIGN OF PHYSICAL DEVICES

TECHNICAL FIELD

This disclosure relates generally to designing and manufacturing physical devices, and in particular but not exclusively, relates to inverse design of optical and electromagnetic devices.

BACKGROUND

Optical and electromagnetic devices are devices that create, manipulate, propagate, and/or measure electromagnetic radiation. Their applications vary broadly and include, but are not limited to, acousto-optic modulators, optical modulators, optical ring resonators, distributed Bragg reflectors, lasers, lenses, transistors, waveguides, antennas, and the like. Design of these devices is sometimes determined through a simple guess and check method in which a small number of design parameters of a pre-determined design are adjusted for suitability to a particular application. However, in actuality, these devices may have design parameters ranging from hundreds all the way to many billions, dependent on the device size and functionality. As functionality of these optical and electromagnetic devices is increased and manufacturing improves to allow for smaller device feature sizes, it becomes increasingly important to take full advantage of these improvements via optimized device design.

Though some techniques for generating device designs exist, some of these techniques simply generate device designs without considering whether the generated designs can be fabricated. A need exists for techniques for measuring and verifying the fabricability of device designs.

BRIEF SUMMARY

In some embodiments, a non-transitory computer-readable medium is provided. The computer-readable medium has logic stored thereon that, in response to execution by one or more processors of a computing system, cause the computing system to perform actions for creating a fabricable segmented design for a physical device. The actions include receiving, by the computing system, a design specification; determining, by the computing system, a proposed segmented design based on the design specification; simulating, by the computing system, performance of the proposed segmented design; choosing, by the computing system, one or more lattice members and lattice voids to change to improve the performance of the proposed segmented design; and changing, by the computing system, the chosen one or more lattice members and lattice voids of the proposed segmented design. The proposed segmented design includes a plurality of segments that each includes an indication of a material for the segment. The proposed segmented design also includes lattice members and lattice voids, wherein a size of the lattice members and a size of the lattice voids are greater than a size of the segments and are greater than or equal to at least one of a minimum feature width and a minimum feature spacing of a fabrication system.

In some embodiments, a method for creating a fabricable segmented design for a physical device is provided. A computing system receives a design specification. The computing system determines a proposed segmented design based on the design specification. The proposed segmented design includes a plurality of segments that each includes an indication of a material for the segment, and also includes lattice members and lattice voids. A size of the lattice members and a size of the lattice voids are greater than a size of the segments and are greater than or equal to at least one of a minimum feature width and a minimum feature spacing of a fabrication system. The computing system simulates performance of the proposed segmented design. The computing system chooses one or more lattice members and lattice voids to change to improve the performance of the proposed segmented design. The computing system changes the chosen one or more lattice members and lattice voids of the proposed segmented design.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described. To easily identify the discussion of any particular element or act, the most significant digit or digits in a reference number refer to the figure number in which that element is first introduced.

DETAILED DESCRIPTION

Figure 1A:
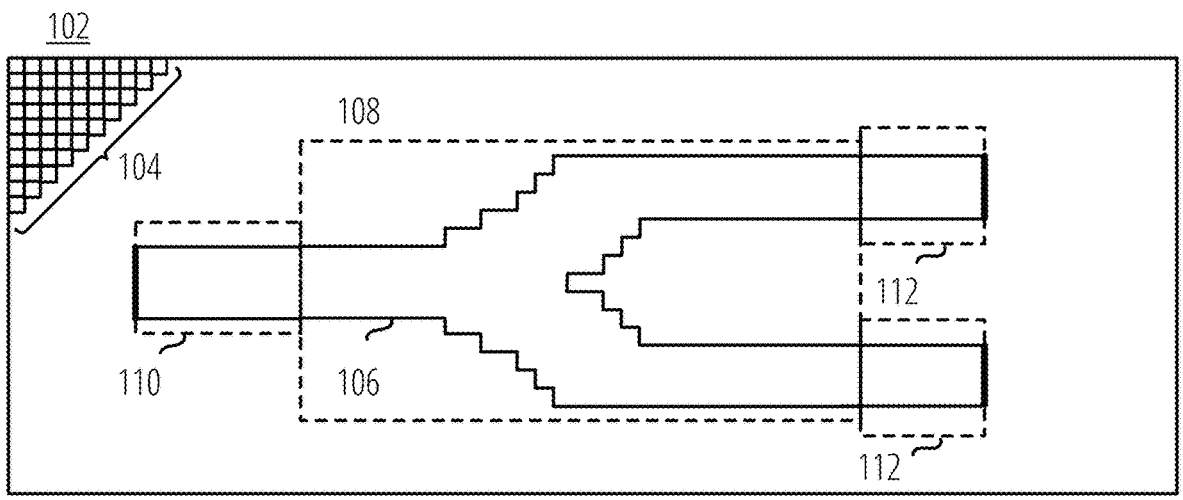
FIG. 1A illustrates a demonstrative simulated environment describing a photonic integrated circuit, in accordance with an embodiment of the present disclosure.
Figure 1B:
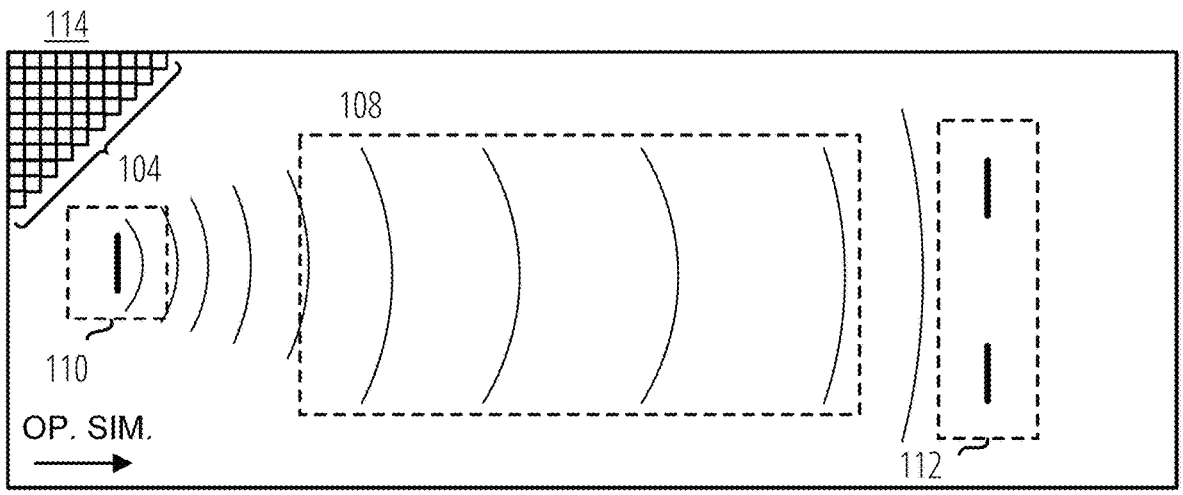
FIG. 1B illustrates an example operational simulation of a photonic integrated circuit, in accordance with an embodiment of the present disclosure.
Figure 1C:
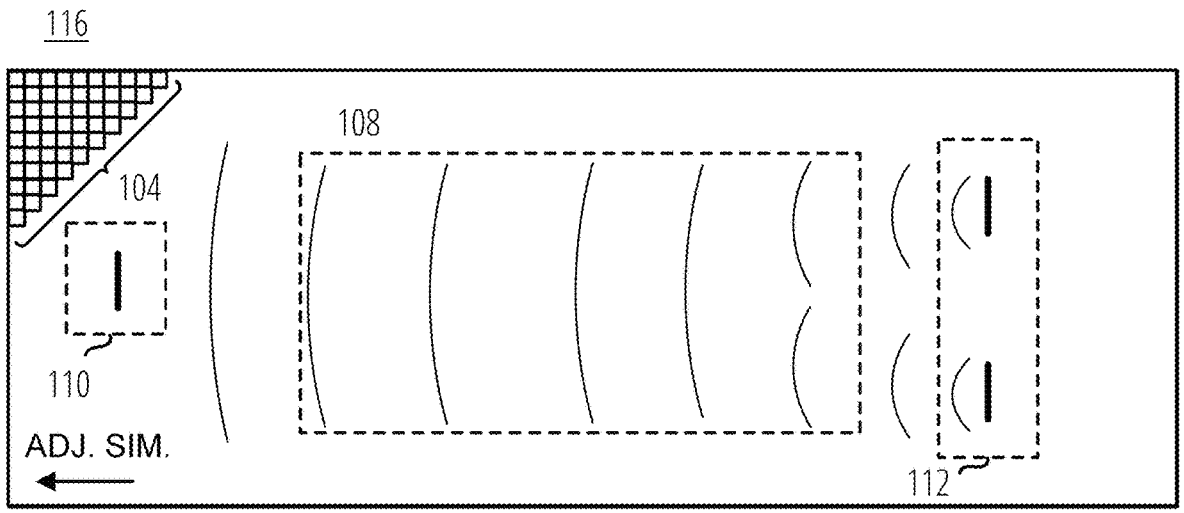
FIG. 1C illustrates an example adjoint simulation within the simulated environment by backpropagating a loss value, in accordance with an embodiment of the present disclosure.

FIG. 1A-FIG. 1C respectively illustrate an initial set up of a simulated environment describing a photonic device, performing an operational simulation of the photonic device in response to an excitation source within a simulated environment, and performing an adjoint simulation of the photonic device within a simulated environment. As illustrated in FIG. 1A-FIG. 1C, simulated environment is represented in two-dimensions. However, it is appreciated that other dimensionality (e.g., 3-dimensional space) may also be used to describe the simulated environment and the photonic device. In some embodiments, optimization of structural parameters of the photonic device illustrated in FIG.

1A-FIG. 1C may be achieved via an inverse design process including, inter alia, simulations (e.g., operational simulations and adjoint simulations) that utilize a finite-difference time-domain (FDTD) method, a finite-difference frequency-domain (FDFD) method, or other computational EM methods to model the field response (e.g., electric and magnetic field) to an excitation source. The description of FIG. 1A to FIG. 1C primarily relates to a technique that uses an FDTD simulation. In some embodiments, other techniques that use other types of simulations may be used, and may differ from that illustrated in FIG. 1A to FIG. 1C.

FIG. 1A illustrates a demonstrative simulated environment 102 describing a photonic integrated circuit (i.e., a photonic device such as a waveguide, demultiplexer, and the like), in accordance with an embodiment of the present disclosure. More specifically, in response to receiving an initial description of a photonic device defined by one or more structural parameters (e.g., an input design), a system configures a simulated environment 102 to be representative of the photonic device. As illustrated, the simulated environment 102 (and subsequently the photonic device) is described by a plurality of segments 104, which represent individual elements (i.e., discretized) of the two-dimensional (or other dimensionality) space. Each of the segments 104 is illustrated as two-dimensional squares; however, it is appreciated that the segments may be represented as cubes or other shapes in three-dimensional space. It is appreciated that the specific shape and dimensionality of the plurality of segments 104 may be adjusted depending on the simulated environment 102 and photonic device (or other physical device) being simulated. It is further noted that only a portion of the plurality of segments 104 are illustrated to avoid obscuring other aspects of the simulated environment 102.

Each of the plurality of segments 104 may be associated with a structural value, a field value, and a source value. Collectively, the structural values of the simulated environment 102 describe the structural parameter of the photonic device. In one embodiment, the structural values may correspond to a relative permittivity, permeability, and/or refractive index that collectively describe structural (i.e., material) boundaries or interfaces of the photonic device. For example, an interface 106 is representative of where relative permittivity changes within the simulated environment 102 and may define a boundary of the photonic device where a first material meets or otherwise interfaces with a second material. The field value describes the field (or loss) response that is calculated (e.g., via Maxwell's equations) in response to an excitation source described by the source value. The field response, for example, may correspond to a vector describing the electric and/or magnetic fields (e.g., in one or more orthogonal directions) at a particular time step for each of the plurality of segments 104. Thus, the field response may be based, at least in part, on the structural parameters of the photonic device and the excitation source.

In the illustrated embodiment, the photonic device corresponds to an optical demultiplexer having a design region 108, in which structural parameters of the physical device may be updated or otherwise revised. More specifically, through an inverse design process, iterative gradient-based optimization of a loss metric determined from a loss function is performed to generate a design of the photonic device that functionally causes a multi-channel optical signal to be demultiplexed and guided from input port 110 to a corresponding one of the output ports 112. Thus, input port 110 of the photonic device corresponds to a location of an excitation source to provide an output (e.g., a Gaussian pulse, a wave, a waveguide mode response, and the like). The output of the excitation source interacts with the photonic device based on the structural parameters (e.g., an electromagnetic wave corresponding to the excitation source may be perturbed, retransmitted, attenuated, refracted, reflected, diffracted, scattered, absorbed, dispersed, amplified, or otherwise as the wave propagates through the photonic device within simulated environment 102). In other words, the excitation source may cause the field response of the photonic device to change, which is dependent on the underlying physics governing the physical domain and the structural parameters of the photonic device. The excitation source originates or is otherwise proximate to input port 110 and is positioned to propagate (or otherwise influence the field values of the plurality of segment) through the design region 108 towards output ports 112 of the photonic device. In the illustrated embodiment, the input port 110 and output ports 112 are positioned outside of the design region 108. In other words, in the illustrated embodiment, only a portion of the structural parameters of the photonic device is optimizable.

However, in other embodiments, the entirety of the photonic device may be placed within the design region 108 such that the structural parameters may represent any portion or the entirety of the design of the photonic device. The electric and magnetic fields within the simulated environment 102 (and subsequently the photonic device) may change (e.g., represented by field values of the individual segment that collectively correspond to the field response of the simulated environment) in response to the excitation source. The output ports 112 of the optical demultiplexer may be used for determining a performance metric of the photonic device in response to the excitation source (e.g., power transmission from input port 110 to a specific one of the output ports 112). The initial description of the photonic device, including initial structural parameters, excitation source, performance parameters or metrics, and other parameters describing the photonic device, may be received by a system and used to configure the simulated environment 102 for performing a first-principles based simulation of the photonic device. These specific values and parameters may be defined directly by a user, indirectly (e.g., by a system culling pre-determined values stored in a memory, local storage, or remote resources), or a combination thereof.

FIG. 1B illustrates an operational simulation of the photonic device in response to an excitation source within simulated environment 114, in accordance with various aspects of the present disclosure. In the illustrated embodiment, the photonic device is an optical demultiplexer structured to optically separate each of a plurality of distinct wavelength channels included in a multi-channel optical signal received at input port 110 and respectively guide each of the plurality of distinct wavelength channels to a corresponding one of the plurality of output ports 112. The excitation source may be selected (randomly or otherwise) from the plurality of distinct wavelength channels and originates at input port 110 having a specified spatial, phase, and/or temporal profile. The operational simulation occurs over a plurality of time steps, including the illustrated time step. When performing the operational simulation, changes to the field response (e.g., the field value) for each of the plurality of segments 104 are incrementally updated in response to the excitation source over the plurality of time steps. The changes in the field response at a particular time step are based, at least in part, on the structural parameters, the excitation source, and the field response of the simulated environment 116 at the immediately prior time step included in the plurality of time steps. Similarly, in some embodiments the source value of the plurality of segments 104 is updated (e.g., based on the spatial profile and/or temporal profile describing the excitation source). It is appreciated that the operational simulation is incremental and that the field values (and source values) of the simulated environment 116 are updated incrementally at each time step as time moves forward for each of the plurality of time steps during the operational simulation. It is further noted that in some embodiments, the update is an iterative process and that the update of each field and source value is based, at least in part, on the previous update of each field and source value.

Once the operational simulation reaches a steady state (e.g., changes to the field values in response to the excitation source substantially stabilize or reduce to negligible values) or otherwise concludes, one or more performance metrics may be determined. In some embodiments, the performance metric corresponds to the power transmission at a corresponding one of the output ports 112 mapped to the distinct wavelength channel being simulated by the excitation source. In other words, in some embodiments, the performance metric represents power (at one or more frequencies of interest) in the target mode shape at the specific locations of the output ports 112. A loss value or metric of the input design (e.g., the initial design and/or any refined design in which the structural parameters have been updated) based, at least in part, on the performance metric may be determined via a loss function. The loss metric, in conjunction with an adjoint simulation, may be utilized to determine a structural gradient (e.g., influence of structural parameters on the loss metric) for updating or otherwise revising the structural parameters to reduce the loss metric (i.e. increase the performance metric). It is noted that the loss metric may be further based on a fabrication loss value that is utilized to enforce a minimum feature size or other fabricability constraints of the photonic device to promote fabricability of the device.

FIG. 1C illustrates an example adjoint simulation within simulated environment 116 by backpropagating a loss metric, in accordance with various aspects of the present disclosure. More specifically, the adjoint simulation is a time-backwards simulation in which a loss metric is treated as an excitation source that interacts with the photonic device and causes a loss response. In other words, an adjoint (or virtual source) based on the loss metric is placed at the output region (e.g., output ports 112) or other location that corresponds to a location used when determining the performance metric. The adjoint source(s) is then treated as a physical stimuli or an excitation source during the adjoint simulation. A loss response of the simulated environment 116 is computed for each of the plurality of time steps (e.g., backwards in time) in response to the adjoint source. The loss response collectively refers to loss values of the plurality of segments that are incrementally updated in response to the adjoint source over the plurality of time steps. The change in loss response based on the loss metric may correspond to a loss gradient, which is indicative of how changes in the field response of the physical device influence the loss metric. The loss gradient and the field gradient may be combined in the appropriate way to determine a structural gradient of the photonic device/simulated environment (e.g., how changes in the structural parameters of the photonic device within the simulated environment influence the loss metric). Once the structural gradient of a particular cycle (e.g., operational and adjoint simulation) is known, the structural parameters may be updated to reduce the loss metric and generate a revised description or design of the photonic device.

In some embodiments, iterative cycles of performing the operational simulation, and adjoint simulation, determining the structural gradient, and updating the structural parameters to reduce the loss metric are performed successively as part of an inverse design process that utilizes iterative gradient-based optimization. An optimization scheme such as gradient descent may be utilized to determine specific amounts or degrees of changes to the structural parameters of the photonic device to incrementally reduce the loss metric. More specifically, after each cycle the structural parameters are updated (e.g., optimized) to reduce the loss metric. The operational simulation, adjoint simulation, and updating the structural parameters are iteratively repeated until the loss metric substantially converges or is otherwise below or within a threshold value or range such that the photonic device provides the desired performance while maintaining fabricability.

Figure 2:
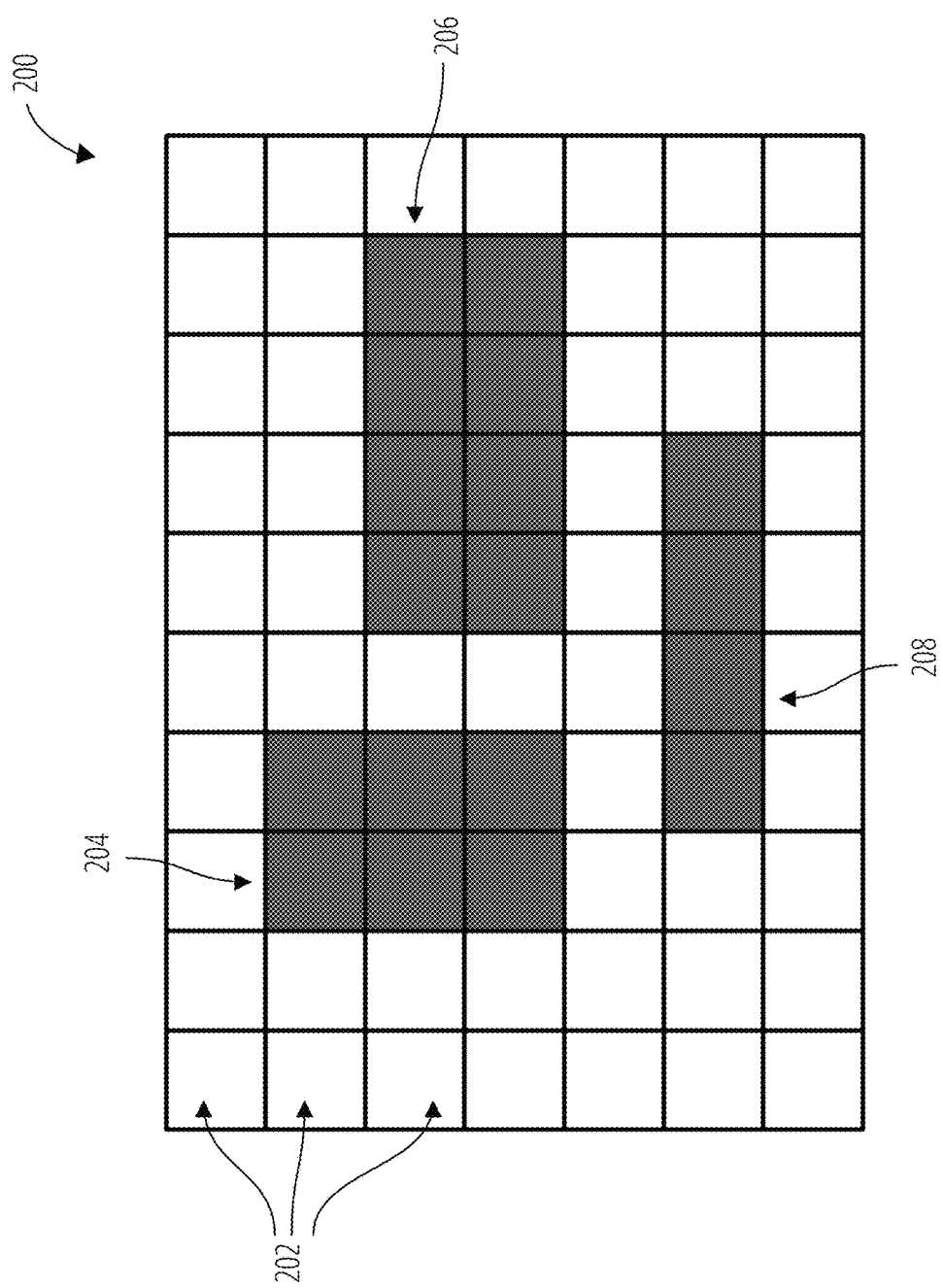
FIG. 2 is a schematic drawing that illustrates a non-limiting example embodiment of a segmented design according to various aspects of the present disclosure.

FIG. 2 is a schematic drawing that illustrates a non-limiting example embodiment of a segmented design according to various aspects of the present disclosure. The segmented design 200 is a non-limiting example of content suitable for insertion in the design region 108 described above (though not drawn to the scale or with the same granularity of segmentation). As shown, the segmented design 200 includes a plurality of segments 202 laid out in a two-dimensional grid. Each of the segments 202 represents a location in the proposed segmented design that can either include a material or not include a material. The material in each of the segments 202 may be considered a structural parameter as described above.

As illustrated, segments that are white indicate a lack of the material, and segments that are dark (such as the first pattern 204, the second pattern 206, and the third pattern 208, indicate a presence of the material. For example, in a photolithography process, segments that are white may represent locations that are not exposed, and segments that are dark may represent locations that are exposed during the photolithography process. As another example, in an additive manufacturing process (e.g., a 3-D printer), segments that are white may represent locations that do not include material, and segments that are dark may represent locations that do include material.

This description is a non-limiting example only, and in some embodiments, the white and dark segments may have another meaning within the segmented design 200. In some embodiments, the segmented design 200 may include more than two colors. For example, a white segment may indicate a lack of material, a segment in a first color may indicate presence of a first material, and a segment in a second color may indicate a presence of a second material. In some embodiments, the segmented design 200 may be three-dimensional or one-dimensional, instead of the two-dimensional segmented design 200 illustrated in FIG. 2.

Typically, a fabrication system can duplicate any segmented design provided to it, subject to certain constraints. For example, a minimum feature size (including but not limited to a minimum feature area, a minimum feature width, and/or a minimum feature spacing), a minimum feature shape, or any other constraint may be specified by the fabrication system as limitations on the segmented designs that the fabrication system can fabricate. Though the design of the segments within the design region 108 can be changed by the optimization techniques discussed above with a high degree of resolution, it is possible that such optimization techniques may result in designs that run afoul of one or more of these fabrication constraints. What is desired are techniques by which segmented designs may be optimized with as high of a resolution as possible while still maintaining fabricability.

Figure 3:
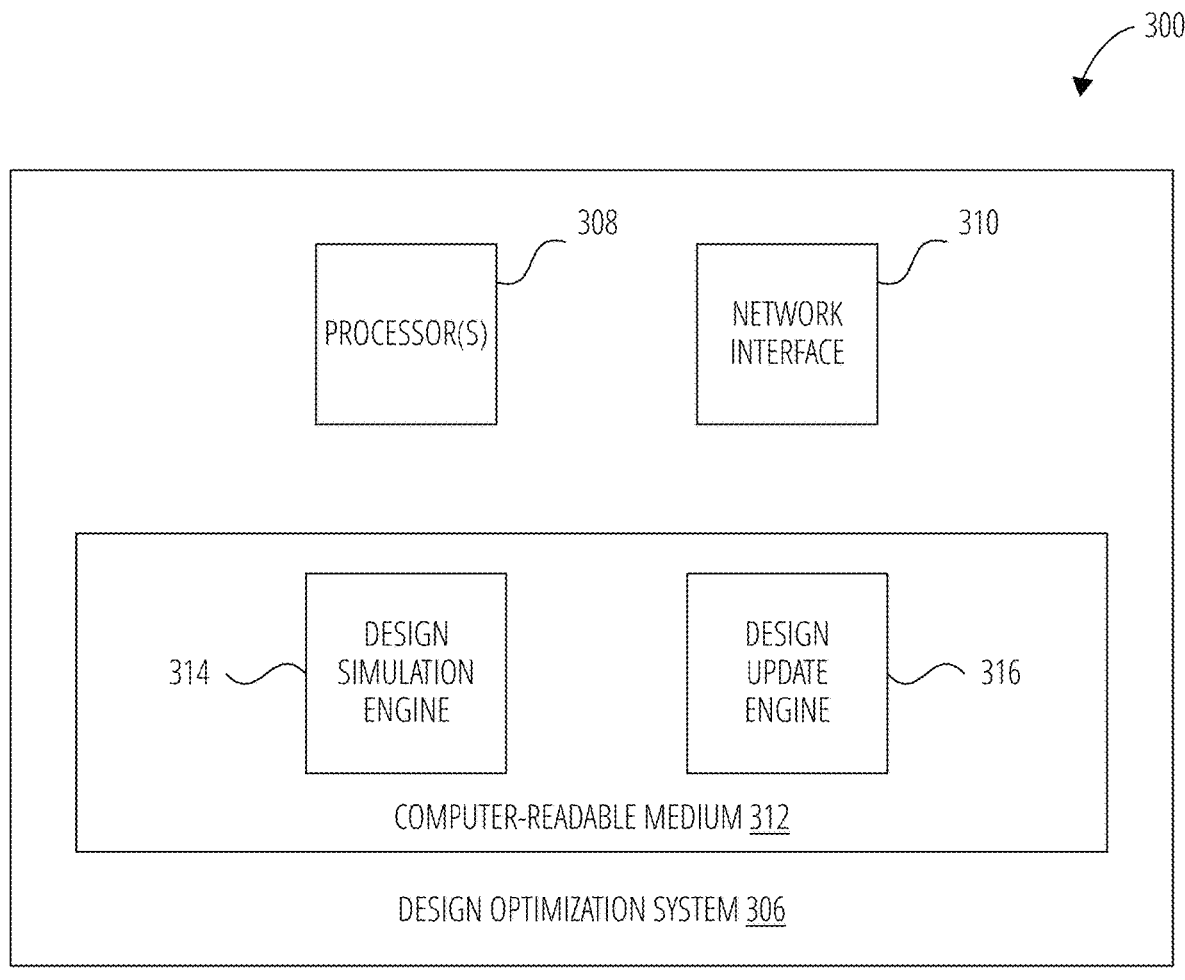
FIG. 3 is a block diagram that illustrates a non-limiting example embodiment of a system for optimizing segmented designs according to various aspects of the present disclosure.
Figure 3:
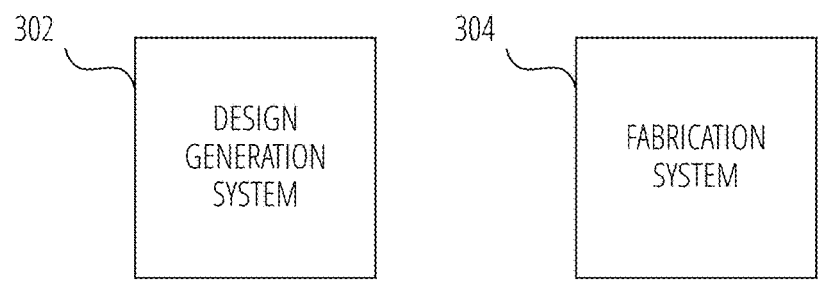

FIG. 3 is a block diagram that illustrates a non-limiting example embodiment of a system for optimizing segmented designs according to various aspects of the present disclosure. Overall, the illustrated embodiment of the system 300 is configured to generate proposed segmented designs, to optimize performance of the proposed segmented designs, and to fabricate physical devices based on the proposed segmented designs.

As shown, the system 300 includes a design generation system 302, a fabrication system 304, and a design optimization system 306. Communication between the design generation system 302, the design optimization system 306, and the fabrication system 304 may occur via a network (not pictured), via exchange of a removable computer-readable medium (not pictured), or via any other suitable technique. Though the design generation system 302, fabrication system 304, and design optimization system 306 are illustrated as separate systems, in some embodiments, some portions of these systems may be combined. As one non-limiting example, the design generation system 302 and the design optimization system 306 may be combined in a single system. Also, in some embodiments, systems illustrated in FIG. 3 as a single system may be broken into multiple systems.

In some embodiments, the design generation system 302 may include one or more computing devices that are configured to generate segmented designs that achieve a desired result. For example, the design generation system 302 may use forward simulation and backpropagation techniques to generate a segmented design for an electromagnetic device (or any other type of physical device) that has desired characteristics. This is a non-limiting example only, and any other technique, including but not limited to manual design, may be used by the design generation system 302 to create proposed segmented designs.

In some embodiments, the fabrication system 304 may be any suitable system for fabricating a segmented design. In some embodiments, the fabrication system 304 may be a photolithography system or an additive manufacturing system. In some embodiments, the fabrication system 304 may have characteristics that include a minimum feature size, a minimum feature shape, and/or other constraints that help define the segmented designs that the fabrication system 304 is capable of fabricating. To that end, the fabrication system 304 may provide a design rule checker that is configured to process proposed segmented designs in an inefficient legacy manner to determine whether the proposed segmented designs comply with the constraints of the fabrication system 304.

In some embodiments, the design optimization system 306 may be any suitable computing device or collection of computing devices configured to provide the described functionality. In some embodiments, the design optimization system 306 may be a server computing device, a desktop computing device, a laptop computing device, a mobile computing device, a tablet computing device, or one or more computing devices of a cloud computing system.

As shown, the design optimization system 306 includes one or more processors 308, a network interface 310, and a computer-readable medium 312. In some embodiments, the one or more processors 308 may include a plurality of processors and/or a plurality of processing cores in order to provide a large amount of computing power. In some embodiments, the network interface 310 may be configured to communicate with the design generation system 302 and/or the fabrication system 304 via any suitable type of wired network (including but not limited to Ethernet, Fire-Wire, and USB), wireless network (including but not limited to 2G, 3G, 4G, 5G, LTE, Wi-Fi, WiMAX, and Bluetooth), or combinations thereof. In some embodiments, instead of a network interface 310, the design optimization system 306 may be configured to communicate with the design generation system 302 and/or the fabrication system 304 via transfer of a removable computer-readable medium (not shown).

As shown, the computer-readable medium 312 has stored thereon logic that, in response to execution by the one or more processors 308, cause the design optimization system 306 to provide a design simulation engine 314 and a design update engine 316.

In some embodiments, the design simulation engine 314 is configured to simulate performance of a proposed segmented design and to generate a loss value (such as a performance loss value) that describes the performance with respect to one or more performance goals. In some embodiments, the design update engine 316 is configured to modify proposed segmented designs in order to reduce the performance loss value, as is also described in further detail below.

As used herein, "engine" refers to logic embodied in hardware or software instructions, which can be written in a programming language, such as C, C++, C #, COBOL, JAVA™, PHP, Perl, HTML, CSS, JavaScript, VBScript, ASPX, Go, Python, and/or the like. An engine may be compiled into executable programs or written in interpreted programming languages. Software engines may be callable from other engines or from themselves. Generally, the engines described herein refer to logical modules that can be merged with other engines, or can be divided into sub-engines. The engines can be implemented by logic stored in any type of computer-readable medium or computer storage device and be stored on and executed by one or more general purpose computers, thus creating a special purpose computer configured to provide the engine or the functionality thereof. The engines can be implemented by logic programmed into an application-specific integrated circuit (ASIC), a field-programmable gate array (FPGA), or another hardware device.

As used herein, "computer-readable medium" refers to a removable or nonremovable device that implements any technology capable of storing information in a volatile or non-volatile manner to be read by a processor of a computing device, including but not limited to: a hard drive; a flash memory; a solid state drive; random-access memory (RAM); read-only memory (ROM); a CD-ROM, a DVD, or other disk storage; a magnetic cassette; a magnetic tape; and a magnetic disk storage. A computer-readable medium may also include multiple devices configured to collectively store the information described.

Figure 4A:
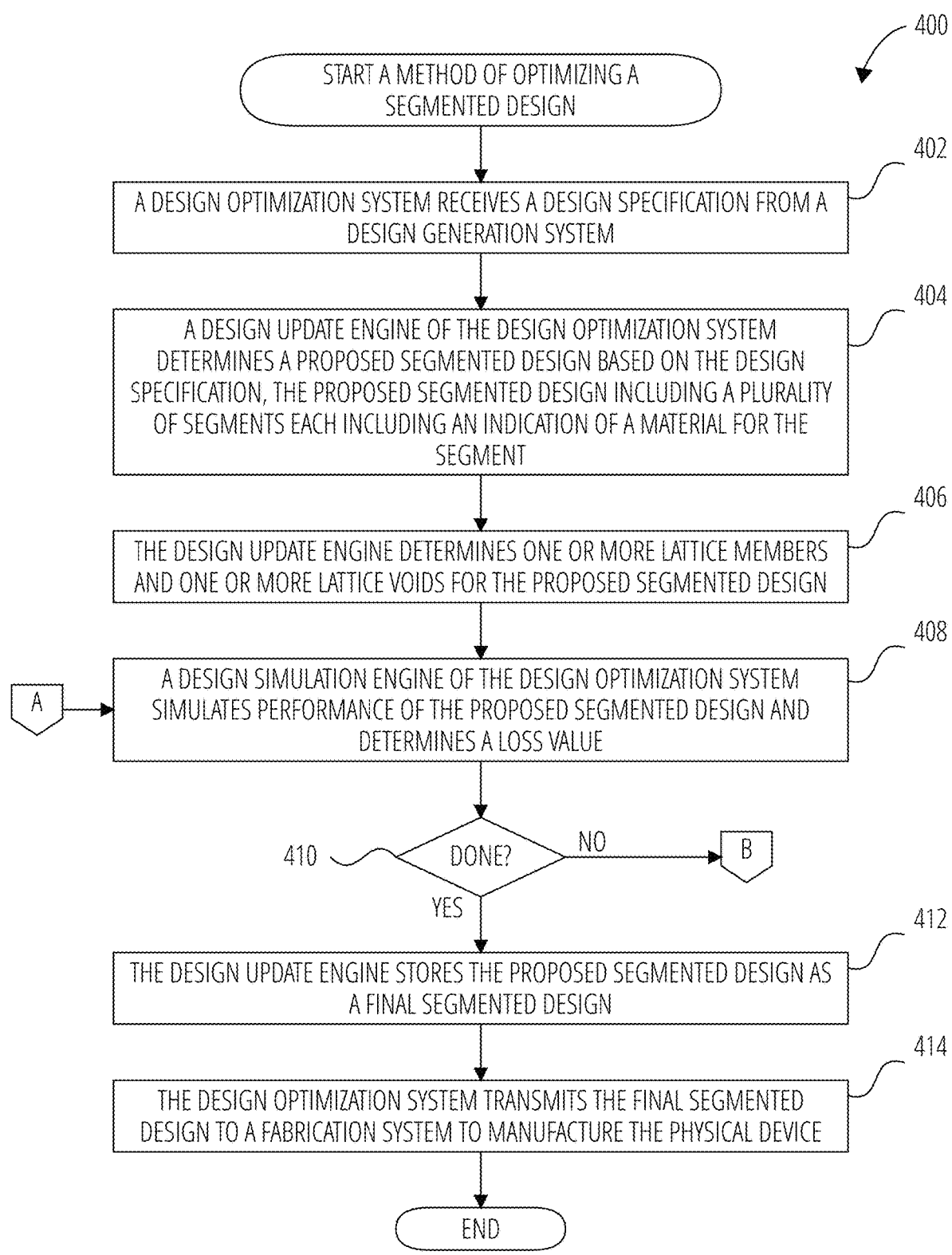
FIG. 4A-FIG. 4B are a flowchart that illustrates a non-limiting example embodiment of a method of optimizing a segmented design according to various aspects of the present disclosure.
Figure 4B:
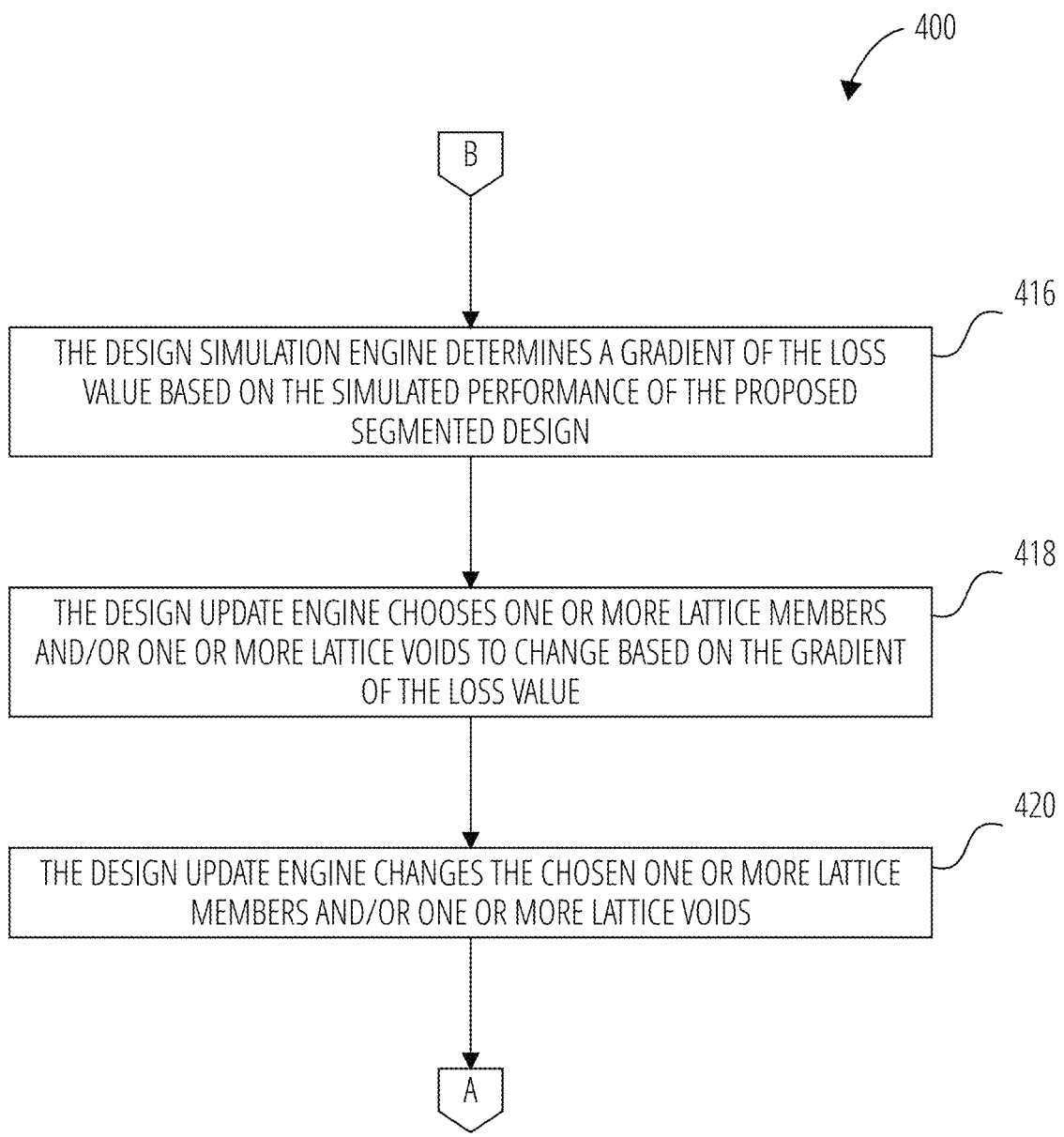

FIG. 4A—FIG. 4B are a flowchart that illustrates a non-limiting example embodiment of a method of optimizing a segmented design according to various aspects of the present disclosure. In embodiments of the method 400, materials in a segmented design are updated based on a lattice pattern superimposed on a design region that is divided into higher-resolution segments, such that any change in the proposed segmented design determined by the method 400 is guaranteed to comply with fabrication constraints imposed by an associated fabrication system.

From a start block, the method 400 proceeds to block 402, where a design optimization system 306 receives a design specification from a fabrication system 304. In some embodiments, the design specification may include a segmented design generated randomly, generated using a naïve optimization technique, using a technique similar to those used by the design update engine 316, generated manually, or generated using any other suitable technique. In some embodiments, the design specification may include a linear function that represents a desired characteristic of the physical device, instead of specifying a segmented design. In some embodiments, the design specification may also include an indication of the desired performance characteristics of the physical device. For example, the design specification may include a performance loss function to be used to evaluate the performance of segmented designs during optimization. As another example, the design specification may include one or more parameters, including but not limited to desired input and/or output wavelengths, to be used by a performance loss function built into the design update engine 316.

At block 404, a design update engine 316 of the design optimization system 306 determines a proposed segmented design based on the design specification, the proposed segmented design including a plurality of segments each including an indication of a material for the segment. Any suitable technique may be used by the design update engine 316 to generate the proposed segmented design based on the design specification. In some embodiments, the design update engine 316 may simply initialize segments of a segmented design having dimensions indicated by the design specification to have initial default values for indications of materials contained therein.

In order to ensure that the proposed segmented design remains fabricable, in some embodiments, the design optimization system 306 organizes the segments of the proposed segmented design into a lattice having properties that ensure that any segmented design based thereon will be fabricable. Accordingly, at block 406, the design update engine 316 determines one or more lattice members and one or more lattice voids for the proposed segmented design.

A "lattice member" is a contiguous set of segments, such as a horizontal set of segments or a vertical set of segments, that are sized such that the contiguous set of segments complies with the fabrication constraints of the fabrication system 304. For example, if a minimum feature size of the fabrication system 304 is four segments wide (that is, the smallest feature that can be fabricated by the fabrication system 304 is four segments wide), then the lattice member will have a width of at least four segments. In some embodiments, the lattice members determined by the design update engine 316 are arranged in a "lattice" pattern (e.g., some lattice members arranged in a first direction and some lattice members arranged in a second direction) such that the segments that are not included in a lattice member form "lattice voids."

In some embodiments, parallel lattice members are spaced apart at a distance that is at least the minimum feature size, so that lattice voids formed therebetween also comply with the fabrication constraints. Typically, the size and spacing of the lattice members is greater than both the size of an individual segment and is greater than or equal to the minimum feature size (e.g., larger than one or more of a minimum feature width, a minimum feature area, and/or a minimum feature spacing) of the fabrication system 304. In some embodiments, the spacing and the size of the lattice members may be the same, while in some embodiments, the spacing of the lattice members is different from the size of the lattice members. Likewise, in some embodiments, lattice members in a first direction may have a size and/or spacing that matches lattice members in a second direction, while in some embodiments, a size and/or a spacing may not match for lattice members in a first direction and lattice members in a second direction. In some embodiments, the lattice members may include segments of a material for which a minimum feature area constraint is relevant. That is, for some fabrication systems 304, an area of a given material may be required to have a minimum area in order to avoid defects in the manufacturing process. By specifying lattice members as containing the given material, the minimum feature area constraint may be met.

Figure 5A:
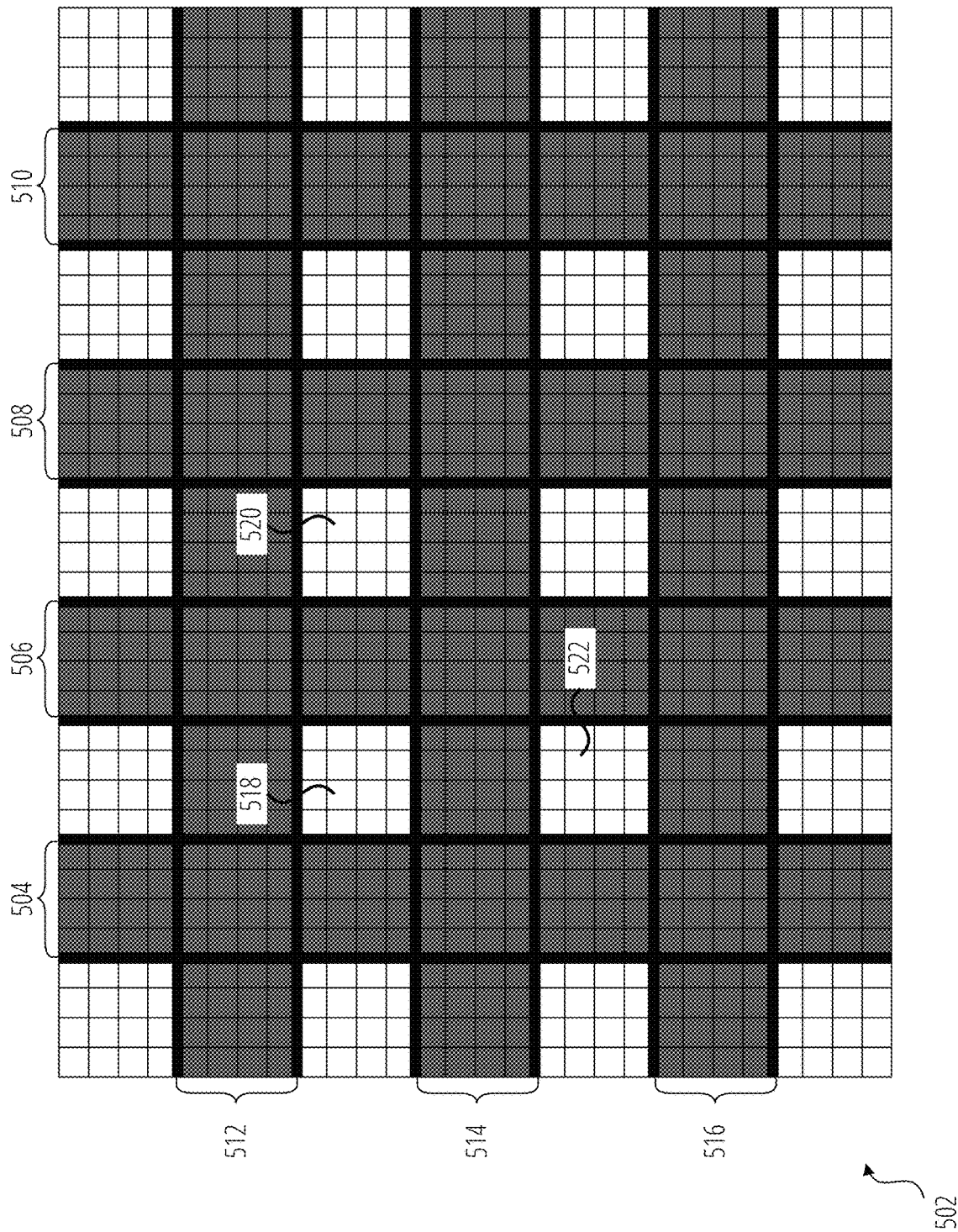
FIG. 5A-FIG. 5E illustrate a non-limiting example embodiment of a proposed segmented design and its optimization according to various aspects of the present disclosure.

FIG. 5A is an illustration of a non-limiting example embodiment of a proposed segmented design for which lattice members and lattice voids have been established according to various aspects of the present disclosure. As shown, the proposed segmented design 502 is 36 segments wide and 28 segments tall. A first vertical lattice member 504, a second vertical lattice member 506, a third vertical lattice member 508, and a fourth vertical lattice member 510 extend from a top edge of the proposed segmented design 502 to a bottom edge of the proposed segmented design 502. A first horizontal lattice member 512, a second horizontal lattice member 514, and a third horizontal lattice member 516 extend from a left edge of the proposed segmented design 502 to a right edge of the proposed segmented design 502. As the vertical lattice members cross the horizontal lattice members, lattice voids are formed, including first lattice void 518, second lattice void 520, and third lattice void 522.

The proposed segmented design 502 assumes that a minimum feature size of the fabrication system 304 is four segments by four segments (or smaller). Accordingly, each lattice member is four segments wide, and is spaced from neighboring lattice members by four segments. This ensures that the lattice members themselves comply with the minimum feature size, and that the lattice voids also comply with the minimum feature size. How this ensures that the proposed segmented design 502 remains fabricable during the optimization process will be illustrated and described below.

Figure 5B:
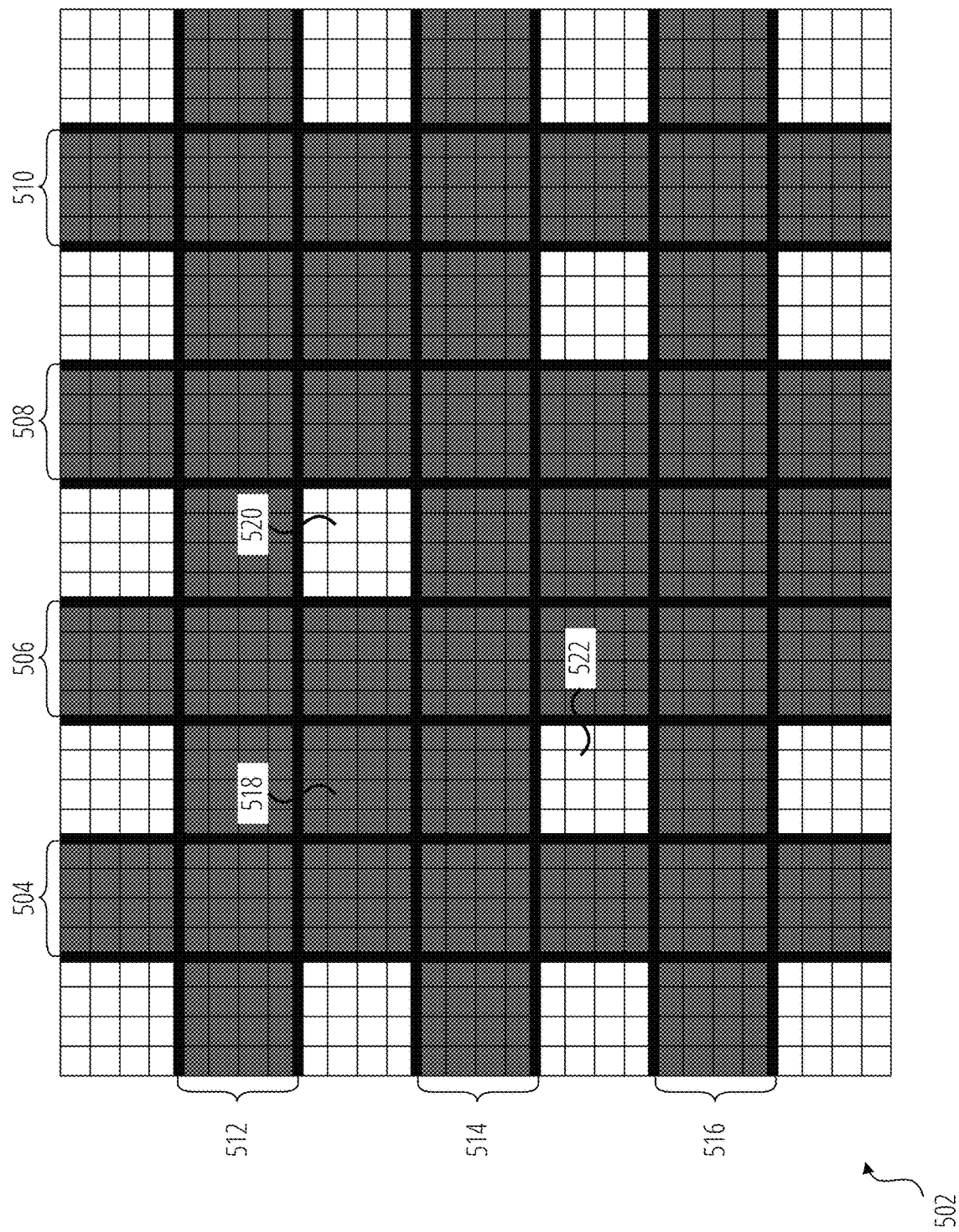

One will note that the lattice members of FIG. 5A are shaded to indicate a first material and the lattice voids of FIG. 5B lack shading to indicate a second material. This is an example only, and in some embodiments, the entire proposed segmented design 502 will remain as indicating a single material after initialization at block 406, or a higher-resolution proposed segmented design will be altered to fit the determined lattice members from block 406. One will also note that the heavy lines separating the lattice members in the figures are provided as a visual guide to the logical organization of the proposed segmented design 502 only, and do not indicate any physical changes in the physical device.

Returning to FIG. 4A, at block 408, a design simulation engine 314 of the design optimization system 306 simulates performance of the proposed segmented design and determines a loss value. The performance may be simulated and the loss value may be determined using any suitable technique. In some embodiments, the operational simulation described above with respect to FIG. 1B may be used to simulate the performance of the proposed segmented design and to determine the loss value.

The method 400 then proceeds to decision block 410, where a determination is made regarding whether the method 400 is done optimizing the proposed segmented design. In some embodiments, the determination may be based on whether the loss value meets a performance threshold that indicates that the proposed segmented design provides a desired level of performance. In some embodiments, the determination may be based on whether a predetermined number of iterations of the optimization of the proposed segmented design have been conducted. In some embodiments, a combination of these factors may be used to determine whether the method 400 is done.

If it is determined that the method 400 is not done optimizing the proposed segmented design, then the result of decision block 410 is NO, and the method 400 proceeds to a continuation terminal (terminal "B"). From terminal B (FIG. 4B), the method 400 proceeds to block 416, where the design simulation engine 314 determines a gradient of a loss value based on the simulated performance of the proposed segmented design. Any suitable technique may be used to determine the gradient of the loss value. For example, the adjoint simulation illustrated in FIG. 1C and described above may be used to determine the gradient for each segment in the proposed segmented design.

At block 418, the design update engine 316 chooses one or more lattice members and/or one or more lattice voids to change based on the gradient of the loss value, and at block 420, the design update engine 316 changes the chosen one or more lattice members and/or one or more lattice voids. Any suitable technique may be used to choose the lattice members and/or the lattice voids. In some embodiments, the design update engine 316 may use the gradients to determine which segments should have their material changed in the proposed segmented design, and may choose one or more lattice members and/or one or more lattice voids based on having a large number of segments for which the design update engine 316 determines that the gradient indicates the material should be changed. In some embodiments, the design update engine 316 may compare the gradient for each segment to a threshold value, and may determine that the material for the segment should be changed if the gradient is greater than the threshold value.

In some embodiments, once a given lattice member and/or a lattice void is chosen by the design update engine 316, the material indicated by all of the segments within the chosen one or more lattice members and/or one or more lattice voids is changed. Doing this is one way to allow the optimization of the proposed segmented design conducted by the method 400 to use similar techniques to those used to optimize the proposed segmented design that ignore fabricability, but while constraining the optimization to only proposed segmented designs that are fabricable. Because the lattice voids are greater than or equal to the minimum feature size, and because the lattice members themselves also have a width greater than or equal to the minimum feature size, altering all of the segments within a lattice member or a lattice void is guaranteed to generate a proposed segmented design that does not include any features smaller than the minimum feature size.

For example, FIG. 5B illustrates a non-limiting example embodiment of the proposed segmented design 502 illustrated in FIG. 5A, after several lattice voids were chosen by the design update engine 316 to be changed. As shown, the first lattice void 518 was chosen, as well as a lattice void to the right of the second lattice void 520, and two lattice voids below the second lattice void 520. Accordingly, these chosen lattice voids are now shaded to indicate the first material. One will note that this has not caused any portion of the proposed segmented design 502 to be smaller than the 4×4 minimum feature size for either material.

Figure 5C:
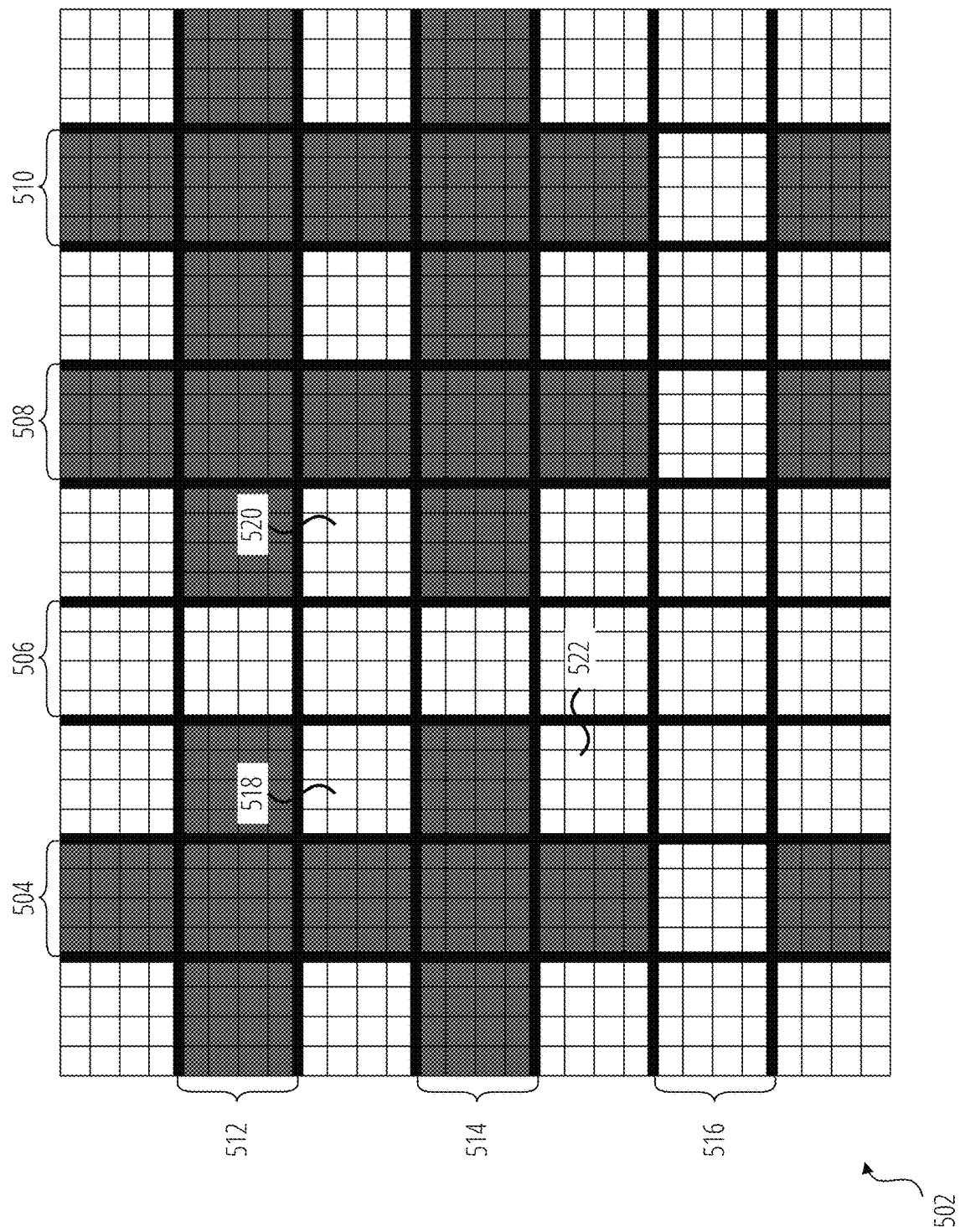

As another example, FIG. 5C illustrates a non-limiting example embodiment of the proposed segmented design 502 illustrated in FIG. 5A after two lattice members were chosen by the design update engine 316 to be changed. As shown, the second vertical lattice member 506 and the third horizontal lattice member 516 were both chosen by the design update engine 316 to be changed. Accordingly, the entirety of the second vertical lattice member 506 and the third horizontal lattice member 516 now lack shading to indicate the second material. Again, one will note that this has not caused any portion of the proposed segmented design 502 to be smaller than the 4×4 minimum feature size for either material.

Figure 5D:
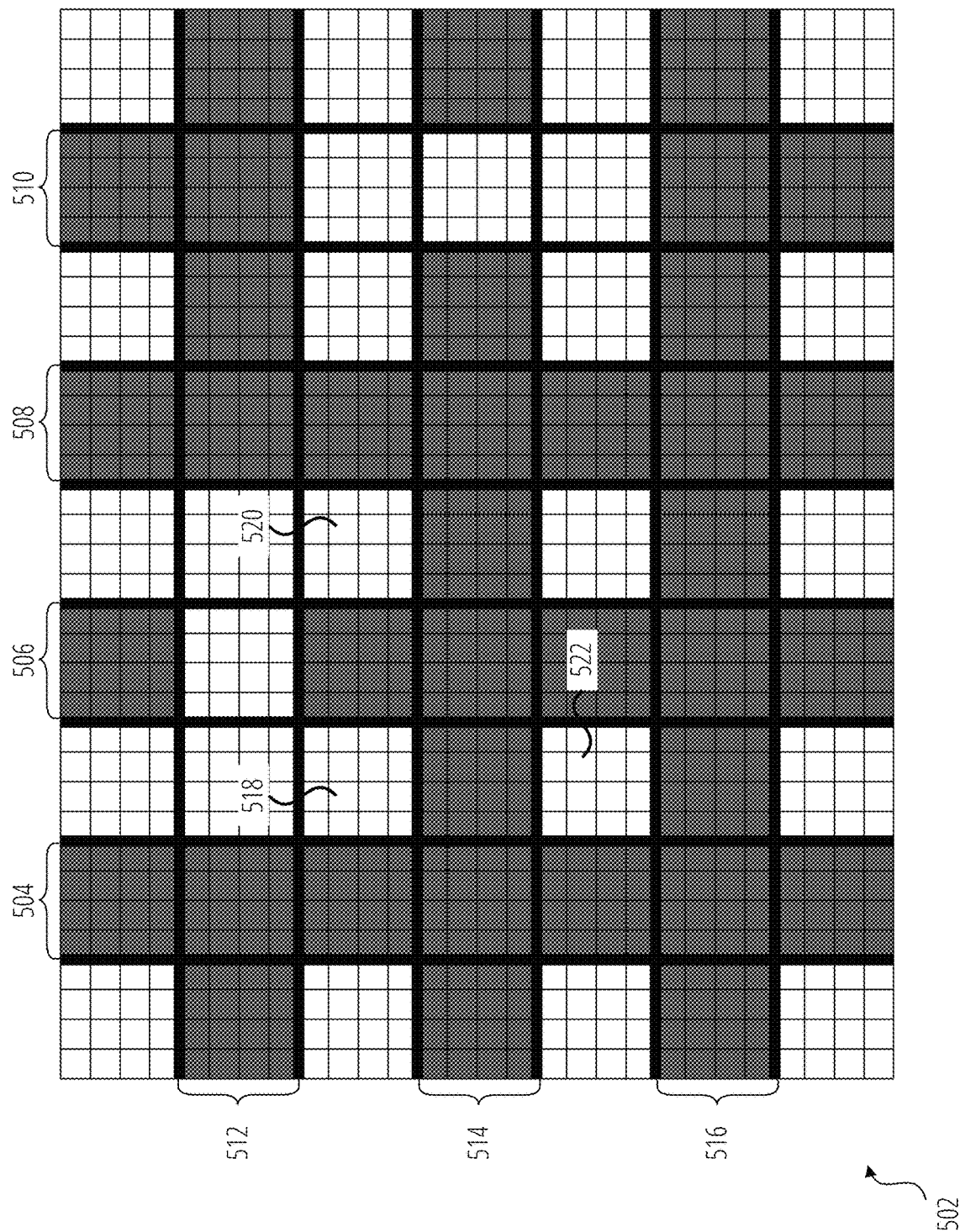

Though FIG. 5C is an example that illustrates changing entire lattice members, in some embodiments, less than an entire lattice member may be changed. FIG. 5D illustrates a non-limiting example embodiment of the proposed segmented design 502 after portions of two lattice members have been changed. As shown, a portion of the first horizontal lattice member 512 between the first vertical lattice member 504 and the third vertical lattice member 508 was changed, as was a portion of the fourth vertical lattice member 510 between the first horizontal lattice member 512 and the third horizontal lattice member 516. In some embodiments, a portion of a lattice member may be changed if the portion spans the entire width of a lattice member and extends through an odd number of crossing lattice members. That is, changing the illustrated portion of first horizontal lattice member 512 between first vertical lattice member 504 and third vertical lattice member 508 is acceptable, but changing a portion of first horizontal lattice member 512 between first vertical lattice member 504 and fourth vertical lattice member 510 would be unacceptable. This prevents the remaining segments from forming a "checkerboard pattern" that is typically unfabricable due to constraints that require a minimum distance between features.

Figure 5E:
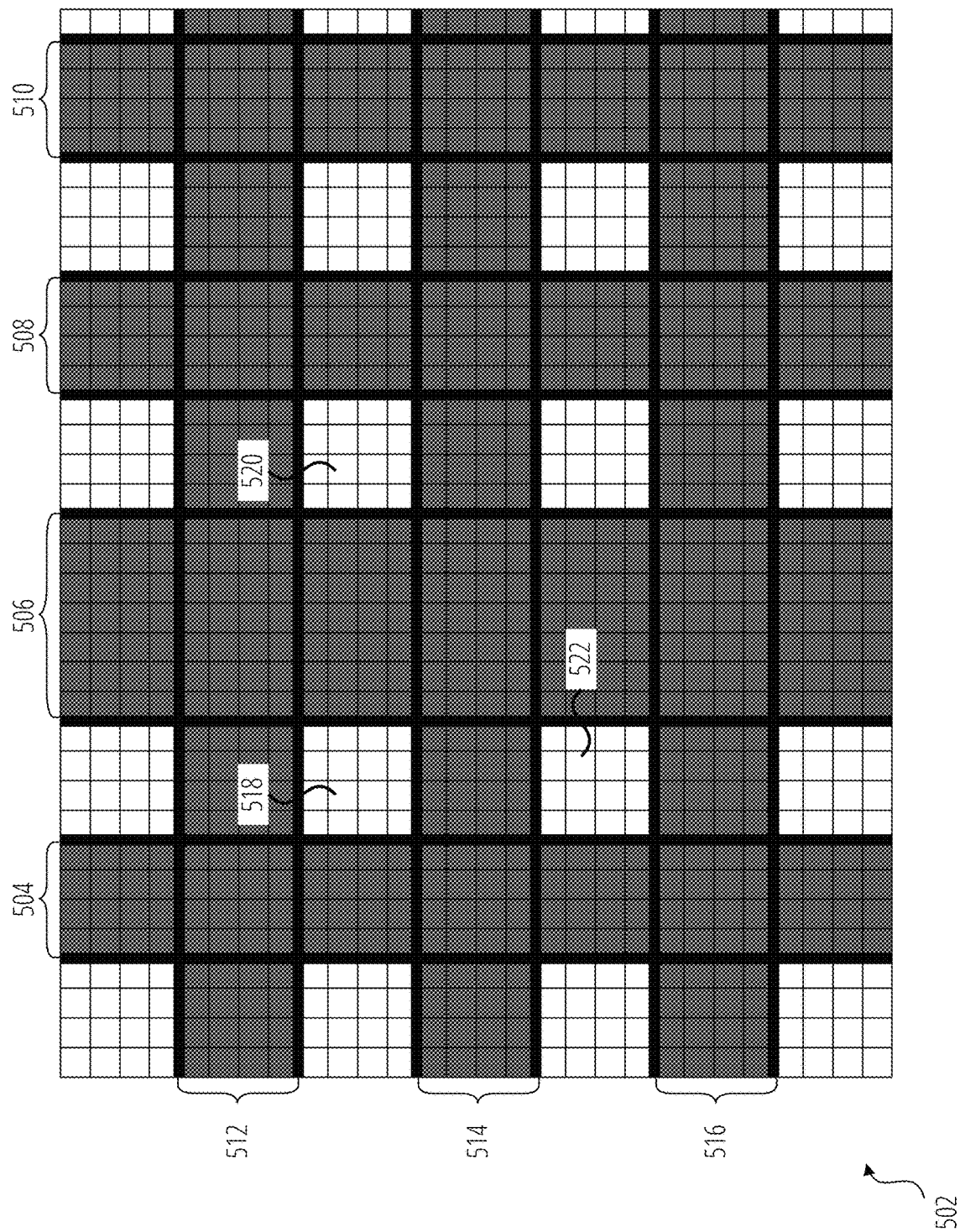

In addition to changing an entire lattice member and changing a portion of a lattice member, other changes may be made to chosen lattice members. FIG. 5E illustrates a non-limiting example embodiment of the proposed segmented design 502 after changing a lattice member by increasing its size. As shown, second vertical lattice member 506 has been made wider (instead of being 4 segments wide, second vertical lattice member 506 is now 7 segments wide). To accommodate this increase in size, third vertical lattice member 508 and fourth vertical lattice member 510 have been moved over, causing second lattice void 520 and the other lattice voids to the right of second vertical lattice member 506 to also be moved over. One will note that moving the other lattice members allows the minimum feature sizes to be maintained throughout the proposed segmented design 502, while changes can be made to the second vertical lattice member 506 in a resolution that is smaller than the minimum feature size (the 3 segment strip of segments that were added to the second vertical lattice member 506 is itself thinner than the minimum feature size would otherwise allow).

Returning to FIG. 4B, after block 420, the method 400 proceeds to a continuation terminal ("terminal A"), where the method 400 returns to block 408 of FIG. 4A, where the design simulation engine 314 simulates performance of the proposed segmented design after the updates have been applied.

Returning to decision block 410 (FIG. 4A), if it was determined that the method 400 is done optimizing the proposed segmented design, then the result of decision block 410 is YES, and the method 400 proceeds to block 412. At block 412, the design update engine 316 stores the proposed segmented design as a final segmented design, and at block 414, the design optimization system 306 transmits the final segmented design to a fabrication system 304 to manufacture the physical device. The method 400 then proceeds to an end block and terminates.

By using lattice members to constrain the changes that can be applied to a proposed segmented design, the speed of the optimization of the proposed segmented design can be greatly increased by searching only designs that are guaranteed to comply with the fabrication constraints of a specified fabrication system 304. While remaining confined to changing lattice members and/or lattice voids in substantially complete portions can provide the greatest benefits in terms of reducing computational workload, it is also to be noted that merely dividing the proposed segmented design using lattice members may provide additional benefits as well. One of the problems of existing optimization techniques is that the amount of work required to optimize a large segmented design grows very quickly with the size of the segmented design. By breaking a large segmented design into sub-designs, techniques that would otherwise be too slow to run on the entire segmented design at once may be accelerated by reducing their size and by optimizing the sub-designs in parallel.

Figure 6:
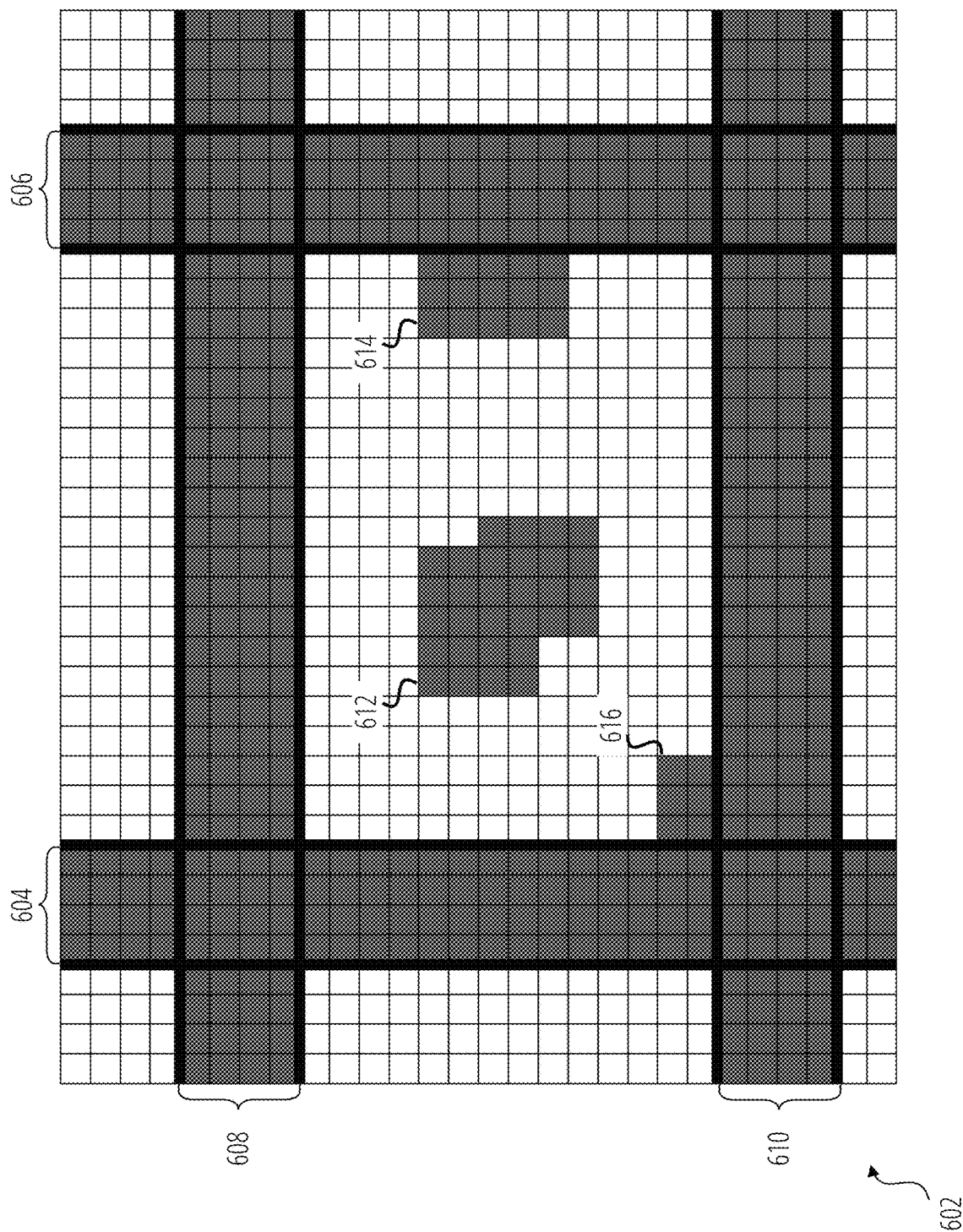
FIG. 6 illustrates another non-limiting example embodiment of a proposed segmented design and its optimization according to various aspects of the present disclosure.

FIG. 6 illustrates a non-limiting example embodiment of a portion of a proposed segmented design divided by lattice members according to various aspects of the present disclosure. In the proposed segmented design 602 illustrated in FIG. 6, a first vertical lattice member 604, a second vertical lattice member 606, a first horizontal lattice member 608, and a second horizontal lattice member 610 are present, but are spaced farther apart than in the previous figures. The resulting lattice void in the center of the proposed segmented design 602 is 20 segments by 14 segments. This 20×14 sub-design may then be optimized using any suitable technique, including but not limited to slower techniques that are not initially constrained to searching only fabricable designs. This allows irregular shapes at a higher resolution than the lattice members, such as first subregion 612, second subregion 614, and third subregion 616, to be generated. The proposed segmented design 602 and the illustrated lattice members may be only a small portion of a much larger segmented design, and each of the lattice voids may be processed by such a technique in parallel. The presence of the lattice members ensures that once the sub-designs are rejoined to the overall design, no violations of the fabricability constraints will be introduced.

One will note that, although two-dimensional designs were illustrated in the figures for the ease of discussion, in some embodiments, similar techniques may be used to optimize segmented designs in three or more dimensions.

In the preceding description, numerous specific details are set forth to provide a thorough understanding of various embodiments of the present disclosure. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The order in which some or all of the blocks appear in each method flowchart should not be deemed limiting. Rather, one of ordinary skill in the art having the benefit of the present disclosure will understand that actions associated with some of the blocks may be executed in a variety of orders not illustrated, or even in parallel.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A non-transitory computer-readable medium having logic stored thereon that, in response to execution by one or more processors of a computing system, cause the computing system to perform actions for creating a fabricable segmented design for a physical device, the actions comprising:
   receiving, by the computing system, a design specification;
   determining, by the computing system, a proposed segmented design based on the design specification, wherein the proposed segmented design includes a plurality of segments, wherein each segment of the plurality of segments includes an indication of a material for the segment, wherein the proposed segmented design includes lattice members and lattice voids, and wherein a size of the lattice members and a size of the lattice voids are greater than a size of the segments and are greater than or equal to at least one of a minimum feature width and a minimum feature spacing of a fabrication system;
   simulating, by the computing system, performance of the proposed segmented design;
   determining, by the computing system, a structural gradient based on the simulated performance of the proposed segmented design;
   choosing, by the computing system, one or more lattice members and lattice voids to change based on the structural gradient to cause the performance of the proposed segmented design to improve; and
   changing, by the computing system, the chosen one or more lattice members and lattice voids of the proposed segmented design, thereby creating an improved segmented design.

2. The non-transitory computer-readable medium of claim 1, wherein the actions further comprise:
repeating the simulating, choosing, and changing actions until at least one of a desired performance level and a desired number of iterations is reached.

3. The non-transitory computer-readable medium of claim 1, wherein the actions further comprise:
transmitting, by the computing system, the improved segmented design to the fabrication system to cause the fabrication system to fabricate the physical device.

4. The non-transitory computer-readable medium of claim 1, wherein the size of the lattice members causes a minimum feature area of the fabrication system to be met.

5. The non-transitory computer-readable medium of claim 1, wherein changing the chosen one or more lattice members and lattice voids of the proposed segmented design includes changing the material indicated by all of the segments of the chosen one or more lattice members and lattice voids.

6. The non-transitory computer-readable medium of claim 1, wherein changing the chosen one or more lattice members and lattice voids of the proposed segmented design includes increasing a size of a lattice member.

7. The non-transitory computer-readable medium of claim 1, wherein changing the chosen one or more lattice members and lattice voids of the proposed segmented design includes changing the material indicated by a portion of a lattice member.

8. The non-transitory computer-readable medium of claim 7, wherein the portion of the lattice member spans an odd number of crossing lattice members.

9. The non-transitory computer-readable medium of claim 1, wherein the actions further comprise:
optimizing materials indicated by segments within two or more lattice voids in parallel.

10. The non-transitory computer-readable medium of claim 1, wherein simulating performance of the proposed segmented design includes conducting a simulation to model field response to an excitation source.

11. A method for creating a fabricable segmented design for a physical device, the method comprising:
receiving, by a computing system, a design specification;
determining, by the computing system, a proposed segmented design based on the design specification, wherein the proposed segmented design includes a plurality of segments, wherein each segment of the plurality of segments includes an indication of a material for the segment, wherein the proposed segmented design includes lattice members and lattice voids, and wherein a size of the lattice members and a size of the lattice voids are greater than a size of the segments and are greater than or equal to at least one of a minimum feature width and a minimum feature spacing of a fabrication system;
simulating, by the computing system, performance of the proposed segmented design;
determining, by the computing system, a structural gradient based on the simulated performance of the proposed segmented design;
choosing, by the computing system, one or more lattice members and lattice voids to change based on the structural gradient to cause the performance of the proposed segmented design to improve; and
changing, by the computing system, the chosen one or more lattice members and lattice voids of the proposed segmented design, thereby creating an improved segmented design.

12. The method of claim 11, further comprising:
repeating the simulating, choosing, and changing actions until at least one of a desired performance level and a desired number of iterations is reached.

13. The method of claim 11, further comprising:
transmitting, by the computing system, the improved segmented design to the fabrication system to cause the fabrication system to fabricate the physical device.

14. The method of claim 11, wherein the size of the lattice members causes a minimum feature area of the fabrication system to be met.

15. The method of claim 11, wherein changing the chosen one or more lattice members and lattice voids of the proposed segmented design includes changing the material indicated by all of the segments of the chosen one or more lattice members and lattice voids.

16. The method of claim 11, wherein changing the chosen one or more lattice members and lattice voids of the proposed segmented design includes increasing a size of a lattice member.

17. The method of claim 11, wherein changing the chosen one or more lattice members and lattice voids of the proposed segmented design includes changing the material indicated by a portion of a lattice member.

18. The method of claim 17, wherein the portion of the lattice member spans an odd number of crossing lattice members.

19. The method of claim 11, further comprising:
optimizing materials indicated by segments within two or more lattice voids in parallel.

20. The method of claim 11, wherein simulating performance of the proposed segmented design includes conducting a simulation to model field response to an excitation source.

* * * * *